United States Patent [19]
Ishifuji et al.

[11] Patent Number: 6,010,075
[45] Date of Patent: Jan. 4, 2000

[54] MOVING OBJECT IDENTIFICATION METHOD AND APPARATUS

[75] Inventors: Tomoaki Ishifuji, Tokyo; Toshikazu Nishino, Kawasaki; Takeshi Saitoh, Tokyo; Masaaki Shida, Hachioji, all of Japan

[73] Assignee: Hitachi, Ltd., Tokyo, Japan

[21] Appl. No.: 08/981,639

[22] PCT Filed: Nov. 12, 1997

[86] PCT No.: PCT/JP97/04123

§ 371 Date: Jan. 8, 1998

§ 102(e) Date: Jan. 8, 1998

[87] PCT Pub. No.: WO98/21691

PCT Pub. Date: May 22, 1998

[30] Foreign Application Priority Data

Nov. 13, 1996 [JP] Japan .................................... 8-301539
Nov. 13, 1996 [JP] Japan .................................... 8-301540

[51] Int. Cl.[7] .................................................. G06K 19/06
[52] U.S. Cl. ................ 235/492; 235/462.01; 340/825.31
[58] Field of Search .................................... 235/382, 380, 235/437, 492, 462.01; 902/2; 340/825.31, 825.32, 825.34, 825.54, 825.14, 825.21

[56] References Cited

U.S. PATENT DOCUMENTS

| | | | |
|---|---|---|---|
| 4,730,188 | 3/1988 | Milheiser | 340/825 |
| 4,899,158 | 2/1990 | Saeki et al. | 342/44 |
| 4,983,976 | 1/1991 | Ogata et al. | 342/42 |
| 5,157,687 | 10/1992 | Tymes | 235/472.01 X |
| 5,340,968 | 8/1994 | Watanabe et al. | 235/380 |
| 5,382,778 | 1/1995 | Takahira et al. | 235/380 |
| 5,500,650 | 3/1996 | Snodgrass et al. | 342/42 |
| 5,557,096 | 9/1996 | Watanabe et al. | 235/492 |
| 5,698,837 | 12/1997 | Furuta | 235/492 |
| 5,745,525 | 4/1998 | Hunsinger et al. | 375/285 |
| 5,841,365 | 11/1998 | Rimkus | 340/825.35 |

FOREIGN PATENT DOCUMENTS

| | | |
|---|---|---|
| 63-134978 | 6/1988 | Japan . |
| 1-182779 | 7/1989 | Japan . |
| 4-361915 | 12/1992 | Japan . |
| 5-297127 | 11/1993 | Japan . |
| 6-60229 | 3/1994 | Japan . |
| 7-175901 | 7/1995 | Japan . |
| 8-123919 | 5/1996 | Japan . |

*Primary Examiner*—Thien M. Le
*Assistant Examiner*—Diane I. Lee
*Attorney, Agent, or Firm*—Antonelli, Terry, Stout & Kraus, LLP

[57] ABSTRACT

An IC card (107) sends its identification code in units of one bit in response to a question from a controller (103). The controller sends back to the IC card the received one bit of the identification code. The IC card compares the received and sent bits. If both are equal, the IC card sends the next one bit to the controller and if not, refrains from sending the next one bit. Thus, even when the number of IC cards which are to be identified and the number of IC cards which send their identification codes are simultaneously large, a reduction in the identification efficiency is suppressed to within a small value.

10 Claims, 15 Drawing Sheets a : COMMAND OR DATA
b : SYNC BITS (WHEN '01111', SENT SIGNAL IS A
    COMMAND; WHEN '11111', SENT SIGNAL IS DATA)

c : ONE BIT DATA ('0011' REPRESENTS "0"; '1100'
    REPRESENTS "1")
    UP DATA IS DEFINED TO BE A RESPONSE OF
    CARD TO LAST COMMAND

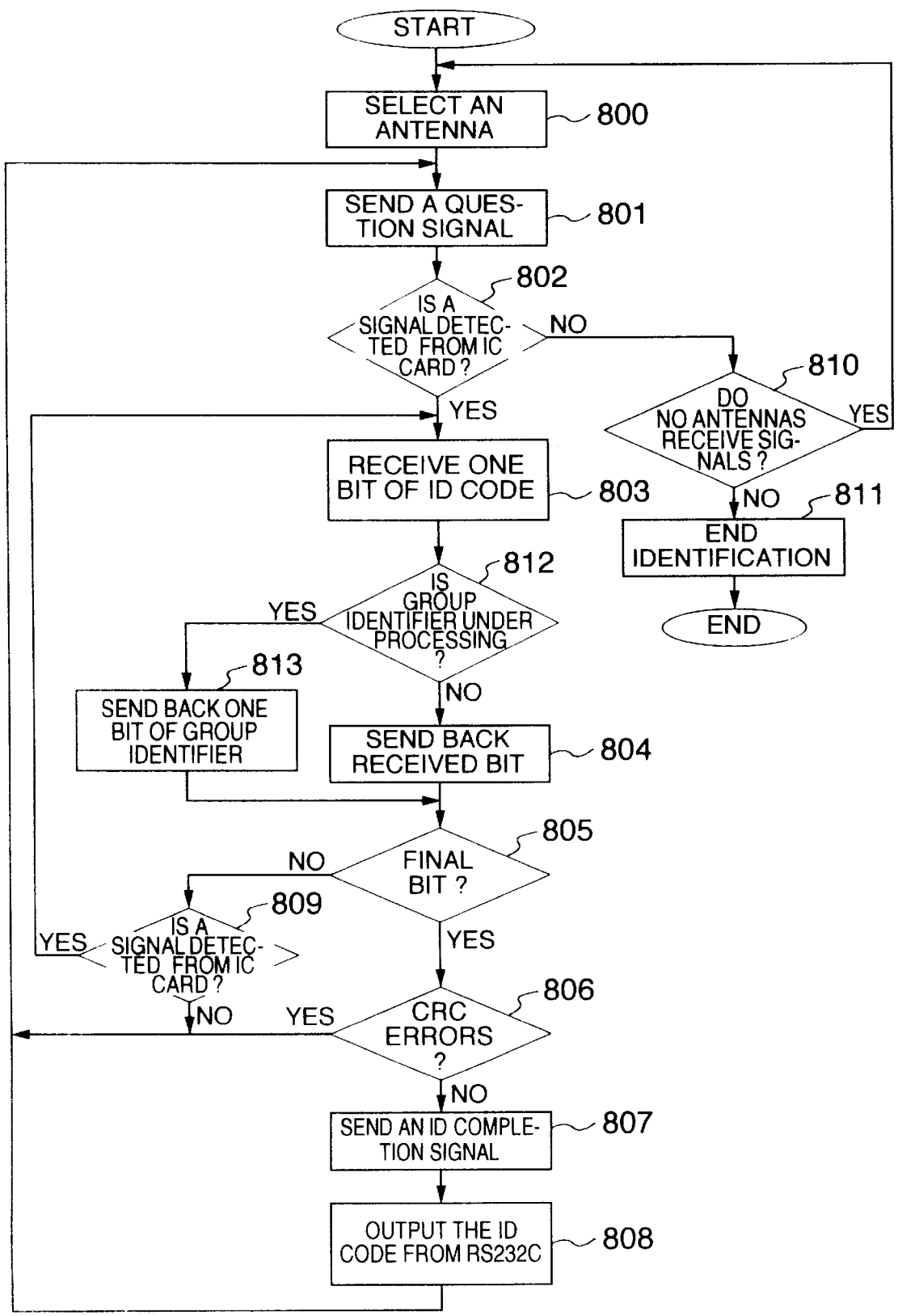

FIG.13

| # | COMMAND | CONTENTS | COMMAND MODE |
|---|---|---|---|
| 1 | INITIALIZE | TO RETURN A CONGESTION CONTROL PROTOCOL STATE TO THE INITIAL STATE | 0 |
| 2 | SEND 0 BACK | FOR CONGESTION CONTROL | 2 |
| 3 | SEND 1 BACK | FOR CONGESTION CONTROL | 4 |
| 4 | 1 BIT RETURN | FOR CONGESTION CONTROL | 6 |
| 5 | DATA OK | FOR CONGESTION CONTROL | 8 |
| 6 | DATA OK | FOR CONGESTION CONTROL | 10 |
| 7 | QUESTION | FOR CONGESTION CONTROL | 12 |
| 8 | ID/ADDRESS SPECIFYING & READING | TO READ DATA FROM EEPROM | 14 |
| 9 | ID/ADDRESS SPECIFYING & WRITING | TO WRITE DATA FROM EEPROM | 7 |
| 10 | 1-BIT DATA SENDING BACK COMMAND | USED FOR DATA READING WHEN COMMAND 8 IS EXECUTED | 5 |
| 11 | WRITE STATUS SENDING BACK COMMAND | USED FOR CHECKING "BUSY" WHEN COMMAND 9 IS EXECUTED | 3 |
| 12 | WRITE ENABLE | TO PLACE EEROM IN A WRITABLE STATE | 1 |

SR0: INITIAL STATE
SR1: 1 ID BIT IS ALREADY READ
SR2: 2 ID BITS ARE ALREADY READ
SRn: n ID BITS ARE ALREADY READ
SRH: ID IS ALREADY RECOGNIZED

MOVING OBJECT IDENTIFICATION METHOD AND APPARATUS

TECHNICAL FIELD

This invention relates to an identification method and device which identifies a plurality of response units by sending/receiving a signal between a question unit (inquiry unit) and the plurality of response units. Especially, this invention relates to a moving object identifying method and device in which the question unit controls the congestion of response signals from the plurality of response units affixed to moving objects such as packs.

BACKGROUND ART

Conventionally, physical distribution control systems which collect, and distribute packs have relied on people's hands for a large amount of work. There is known a system which uses bar codes to reduce work by people's hands. However, a small amount of information can only be treated with bar codes and complex automation of the management system cannot be achieved. Moreover, because it is necessary to cause a reader to extremely approach a bar code to read same, work by people's hands will still appear.

Therefore, physical distribution management systems using a tag ID card are proposed on which a large amount of information is recordable and from which information is readable from a position remote from the card in a non-contact manner (JP-A-8-268513).

It is important that such a physical distribution management system reads information accurately from the ID card in a non-contact manner.

U.S. Pat. No. 4,983,976 discloses a moving object identification device which uses electromagnetic waves. In this prior art, electromagnetic waves are radiated from an antenna installed on a question unit toward a response unit at a distance of about 50 cm to 1 m for communicating purposes.

In this case, as the distance between the question and response units increases, the reliability of the communication decreases. While a pack to which a response unit is affixed is moving on a belt conveyer, it is difficult to radiate the electromagnetic waves from the antenna surely to the response unit surely due to the directivity of the antenna, and the reliability of the communication would be reduced.

In addition, when a plurality of response units exist in the coverage of the question unit, it is necessary to identify respective response signals from the plurality of response units. Japanese patent No. 2534295 discloses a technique in which a response unit sends an identification code to a question unit in response to a question signal from the question unit, the question unit sends back to the response unit an affirmative or negative determination signal representing whether the identification of the identification code has succeeded or not, added with an ID number inherent to the response unit, the question unit which has received the affirmative signal does not respond to questions from the question unit thereafter for a predetermined period of time to thereby allow the plurality of response units to be identified sequentially. However, in the prior art, a problem that the question unit cannot normally identify the response units because identification codes from the response units can be sent simultaneously to the question unit and interfere with each other is not considered.

JP-A-9-44614 discloses a technique for preventing response signals from interfering with each other. In this prior art, each question unit sends a one-bit ("0" or "1") signal randomly. A response unit compares the first bit of an ID code inherent to the response unit and the sent random bit. Receiving the following random bit, the response unit compares that random bit and the second bit of the ID code. If the random bit coincides with the first bit of the ID code inherent to the response unit, the response unit compares that random bit with the second bit of the ID code. If the random bit does not coincide with the first bit of the ID code, the response unit again compares that random bit with the first bit of the ID code. This operation is repeated sequentially. When the final bit of the ID code coincides with the random bit, the response unit sends a response signal to the question unit to control the congestion of the response signals. However, the congestion of the response signals cannot be completely removed because there is a possibility that the response signal will be sent to the question unit in response to the same random bit in this method. Especially, as the number of response units used increases, the probability that response signals will be sent simultaneously to the question unit increases. Thus, the reliability of identifying the respective response units would decrease.

DISCLOSURE OF THE INVENTION

To identify a plurality of non-contact IC cards present in the coverage area of a non-contact IC card identification device, the non-contact IC card identification device and each non-contact IC card operate as follows. Receiving a question signal from the identification device, the IC card sends to the identification device a predetermined number of bits of an identification code thereof. The identification device receives the predetermined number of bits and sends them back to the IC card. When the sent-back predetermined number of bits coincide with those which the IC card sent, the IC card sends the identification device a predetermined number of bits subsequent to the already sent predetermined number of bits and then repeats similar processing. When the sent-back predetermined number of bits do not coincide with those which the IC card sent, this IC card does not participate in the identifying process until the IC card receives the next question signal. Finally, by repeating this processing, only this IC card can cause the identification device to recognize the whole identification code thereof. By repeating this recognizing process until no more unprocessed IC cards are left, the identifying process for the plurality of IC cards is completed.

In order to increase the reliability of the communication, the moving object identification device according to this invention includes a plurality of selectable antennas or an antenna whose directionality is changeable.

BRIEF DESCRIPTION OF THE DRAWINGS

FIG. 11 is a flow chart of congestion control by the controller in another IC card identifying process;

FIG. 13 shows a listing of commands for the controller;

BEST MODE FOR CARRYING OUT THE INVENTION

Figure 1:
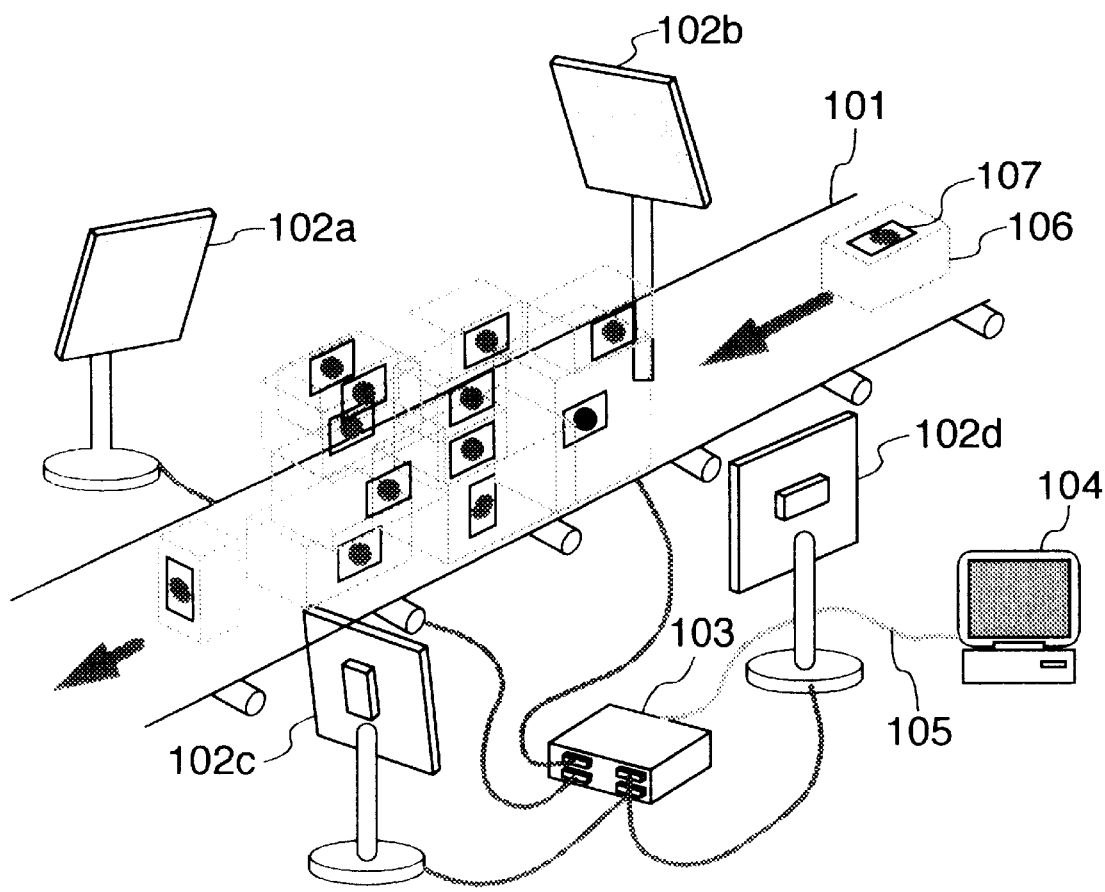
FIG. 1 shows one embodiment of a moving object identification device according to this invention applied to a physical distribution management system.

An embodiment of the moving object identification device according to this invention applied to a physical distribution management system will be described next. The physical distribution management system to which the inventive moving object identification device is applied is shown in FIG. 1 and is provided with a belt conveyer 101, four antennas 102a–d, a controller 103, and a control terminal 104 connected by a RS232C cable 105 to the controller 103. The four antennas are shown, but the number of antennas is not limited to 4. A non-contact IC card 107 is affixed to a surface of a pack or package (hereinafter referred to as "pack" briefly) 106. The IC card 107 includes a non-volatile memory which has stored attributes of the pack such as the identification code, consignor, consignee, contents and weight of the pack.

The pack 106 is conveyed by the belt conveyer 101 into an area of radiation (coverage) of antennas 102a–d. As shown, the pack 106 may be conveyed piled up one upon another, and the orientation of the affixed IC card 107 may have any direction. The controller 103 sends/receives information to/from the IC card 107 via the antenna 102 in accordance with commands from the control terminal 104. The control terminal 104 gives the controller 103 three main commands; that is, a read command, a write command, and an identification command.

Receiving the read command, the controller 103 reads the attributes of the pack written in the non-volatile memory of the IC card 107 and sends the attribute information via the connecting cable 105 to the control terminal 104, which collects and manages the attribute information of the identified pack, and uses the attribute information in the subsequent work (checking and classifying the packs). Receiving the write command, the controller 3 writes into the non-volatile memory of the IC card 107 new information such as information on specification of a route through which the pack is delivered, and a date on which the pack passes any particular position. Receiving the identification command, the controller 103 controls the congestion of responses from the plurality of IC cards 107 present in the coverage thereof to identify the respective IC cards.

Figure 2:
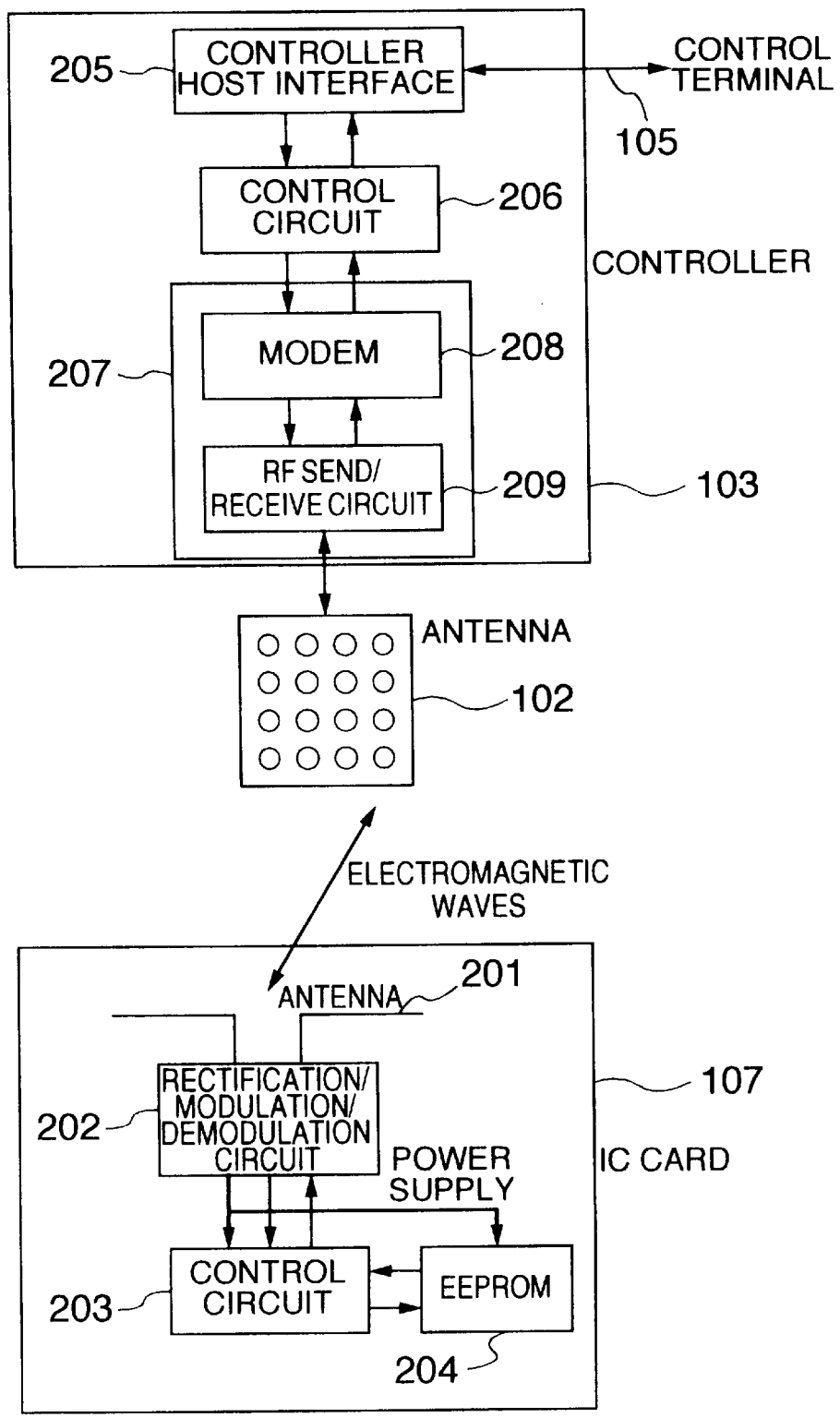
FIG. 2 shows the composition of the inventive moving object identification device and an IC card.

The constructions of the controller 103 and the non-contact IC card 107 will be described with respect to FIG. 2.

The IC card 107 is composed of an antenna 201, a rectification/modulation/demodulation circuit 202, a control circuit 203 and an EEPROM 204. In addition to the EEPROM, a non-volatile memory such as a FRAM (dielectric memory) is usable. The rectification circuit 202 produces a power source from the electromagnetic waves radiated against the antenna 201 and generates a clock signal. The power and clock signals from the rectification circuit 202 are delivered to the control circuit 203 and the memory 204 to communicate with the controller 103 and to read/write data from/into the memory 204. A signal sent from the controller 103 is received by the antenna 201 of the IC card 107 and demodulated by its demodulator circuit 202. The control circuit 203 reads/writes data from/into the memory 204 in accordance with a command of the received signal. Data to be sent by the IC card 107 is read from its memory 204, modulated by the modulator circuit 202 and radiated by the antenna 201.

The controller 103 is composed of a controller's host interface 205 which controls an interface between the control terminal and the connecting cable 105, the control circuit 206 and an RF unit 207. The RF unit 207 includes a modem circuit 208 and an RF send/receive circuit 209. The modem circuit 208 converts a digital signal to an analog signal and vice versa. The RF send/receive circuit 209 converts a baseband analog signal outputted from the modem circuit to a send signal of a carrier frequency band and amplifies the send signal, converts a receive signal of a carrier frequency band received by the antenna to a baseband analog signal and amplifies same.

The antenna 102 may include, for example, a patch array antenna or a slot array antenna or a phased array antenna. The directionality and gain of the antenna 102 are required to be designed so as to have a gain enough to operate the card. The array antenna is suitable this purpose.

Although not shown, when a plurality of antennas are connected to a single controller, the antennas may be selectively connected to the RF send/receive circuit 209. Alternatively, an RF unit 207 may be provided for each antenna so that the RF unit 207 may be connected to the control circuit 206.

The directionality of the antenna of the IC card 107 will be described next with respect to FIGS. 3A–3D and 4A–4D.

Figure 3A:
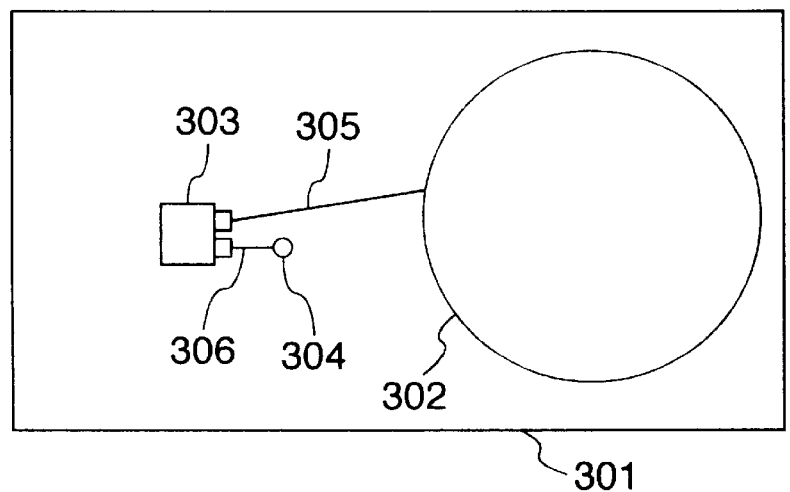
FIGS. 3A–3D show the composition of the IC card and directionality patterns of its antenna.

FIG. 3A illustrates an antenna of the IC card composed of a patch antenna. The patch antenna 302 and an IC chip 303 are provided on an IC card board 301. The IC chip 303 contains the rectification/modulation/demodulation circuit 202, control circuit 203, and EEPROM 204. The IC chip 303 is connected via a micro strip line 306 and a through hole 304 to a grounding point on the back of the IC card board 301 and via a micro strip line 305 to the patch antenna 302.

Figure 3B:
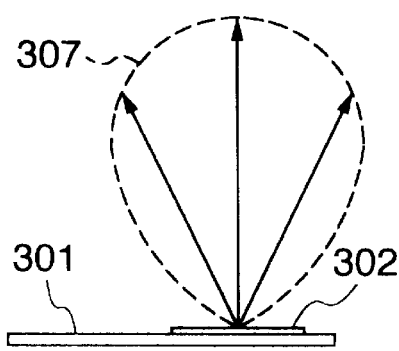
Figure 3C:
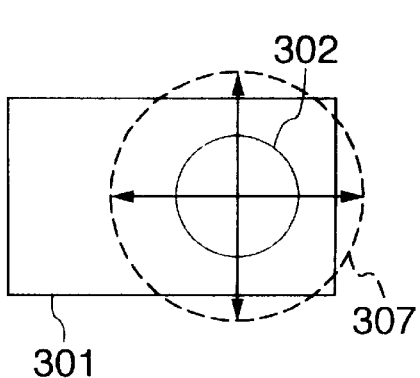
Figure 3D:
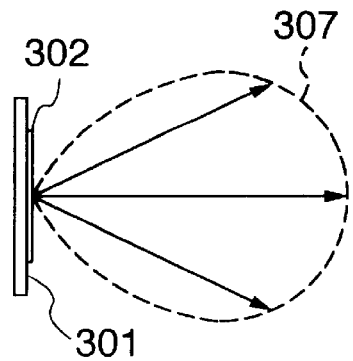

FIGS. 3B–3D show a directional pattern 307 of the patch antenna. FIGS. 3B, C and D are a side, a front and a top view, respectively, of the directional pattern 307. The directional pattern 307 of the patch antenna 302 has the strongest sensitivity in a direction perpendicular to the antenna face and has no sensitivity in a direction parallel to the antenna face and on the back side of the antenna face.

Figure 4A:
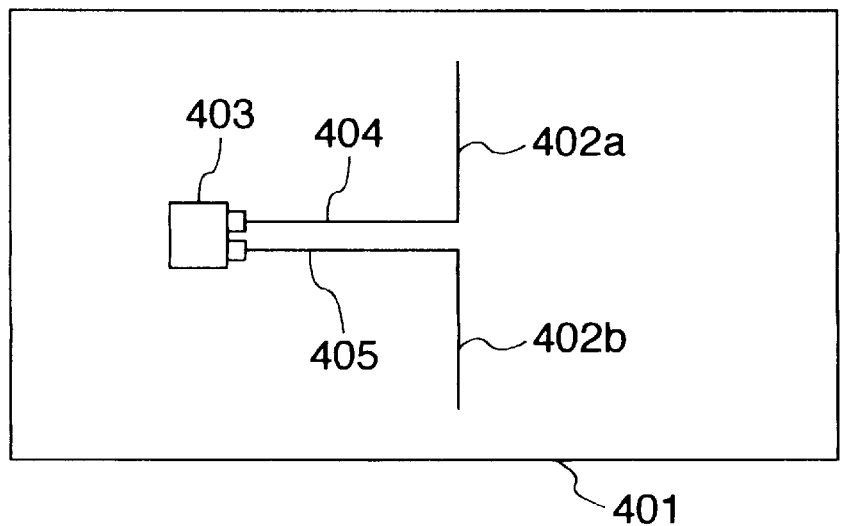
FIGS. 4A–4D show the composition of another IC card and directionality patterns of its antenna.

FIG. 4A illustrates an antenna of an IC card which is composed of a dipole antenna. Provided on the IC card board 401 are a dipole antenna 402 and an IC chip 403. The IC chip 403 contains the rectification/modulation/demodulation circuit 202, control circuit 203 and EEPROM 204. The IC chip 403 is connected via micro strip lines 404, 405 to the dipole antenna 402a and 402b, respectively.

Figure 4B:
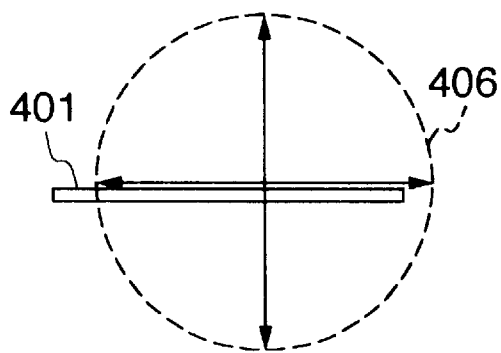
Figure 4C:
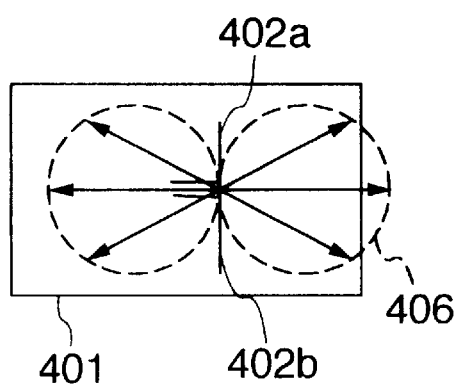
Figure 4D:
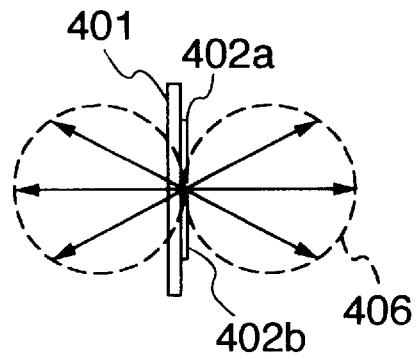

FIGS. 4B–4D each show a directional pattern 406 of the dipole antenna. FIGS. 4B, C and D are a side, a front and a plan view, respectively, of the directional pattern 406. The directional pattern of the dipole antenna 402 has the highest sensitivity in a direction perpendicular to the antenna and has no sensitivity in a direction parallel to the antenna.

As described above, the antenna of the IC has the directionality. The presence of the antenna of the IC card cannot be recognized depending on its relationship to the directionality of the antenna of the controller even when the IC card is within the coverage of the antenna of the controller.

Figure 5:
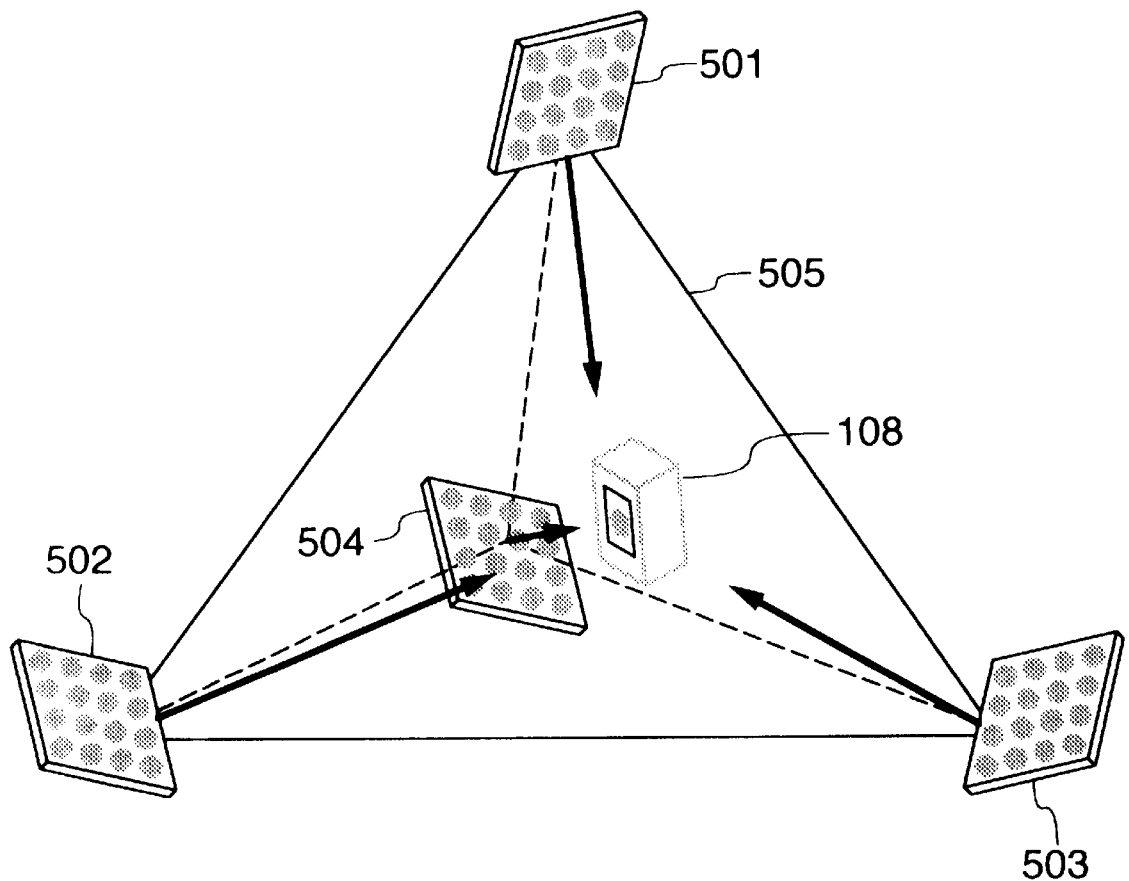
FIG. 5 shows a method of arranging a plurality of antenna.

A method of disposing a plurality of antennas will be described next with reference to FIG. 5. Antenna faces 501, 502, 503 and 504 are disposed at the respective vertexes of the tetrahedron 505 so as to face the center of the tetrahedron 505. With this arrangement of the antennas, the radiating directions of all the antennas are prevented from being parallel to the surface of the IC card present within the tetrahedron. In other words, it is ensured that the radiating direction of at least one antenna is at an angle of less than 90 degrees to the surface of the IC card. Especially, if the tetrahedron is a regular one, the worst value of the radiating angles of the antennas to the IC card surface is minimized.

If three antennas are used and the IC card is placed so that a plane defined by the three antennas is parallel to the IC card surface, the IC card cannot be recognized due to the problem of the directional pattern of the IC card antenna. However, if there is some limitation to the direction of the faces of the antennas into the coverage of which the IC cards come, such problem can be removed.

Figure 6:
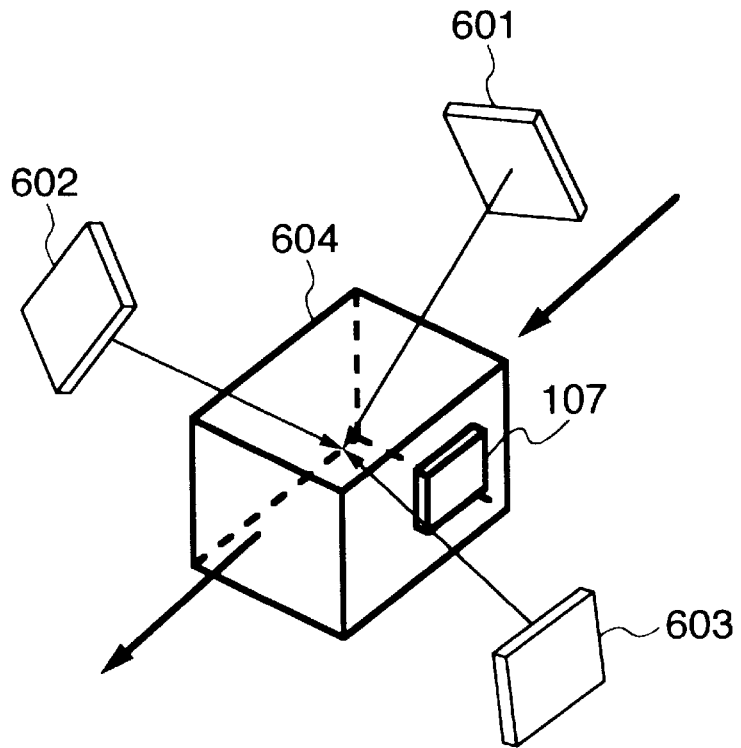
FIG. 6 shows a method of arranging another plurality of antennas.

FIG. 6 shows an embodiment of a moving object identification device with three antennas 601–603 provided at positions spaced 120 degrees from each other in the same plane, and the plane defined by the three antennas are provided so as to intersect at predetermined angle with the belt conveyer 101. In this case, even when the IC card 107 is affixed to any one of surfaces of a pack 604 in the form of a rectangular parallelepiped, the planes defined by the antennas are not parallel to the IC card surface. Thus, the IC card is capable of communicating with its nearest antenna (in the figure, the antenna 603) in a stabilized manner.

Figure 7:
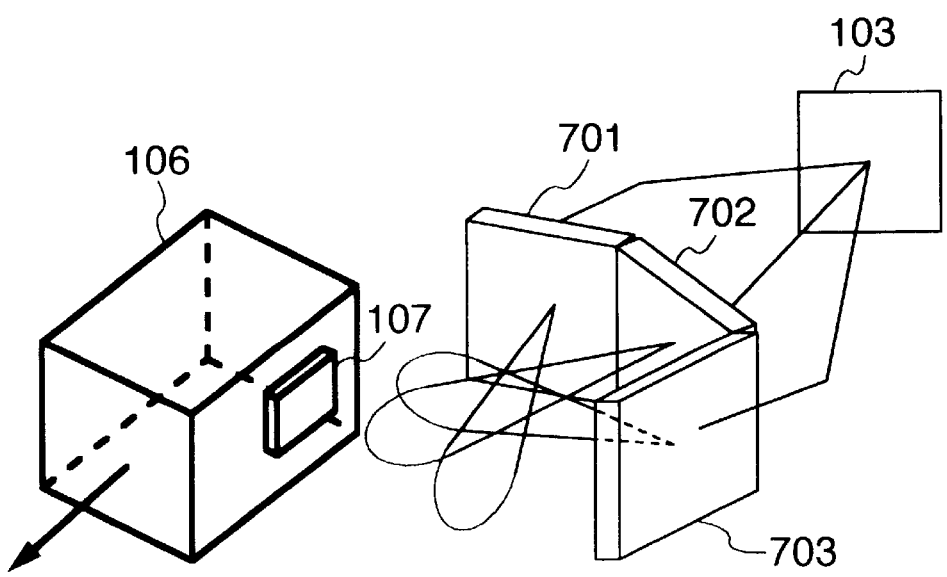
FIG. 7 illustrates the use of a collective antenna.

FIG. 7 illustrates another antenna structure. In order to identify a pack in transportation, the electromagnetic waves radiated from the antenna of the controller preferably have a wide directionality. Since the IC card operates by extracting required power from the electromagnetic waves radiated from the controller antennas, same preferably has a large gain. However, the directional width and gain of the antenna is in a tradeoff relationship.

FIG. 7 illustrates the composition of a collective antenna composed of elements 701–703 disposed so that the radiating directions of the electromagnetic waves are shifted by a predetermined angle one from the other. The antenna elements 701–703 are sequentially switched to find and use an antenna which achieves correct communication. A similar thing is realized by electrically switching a phased array antenna so that the radiating direction of electromagnetic waves from this antenna is shifted by a predetermined angle at a time. Alternatively, a similar thing may be realized by mechanically rotating an antenna whose support shaft is attached at a predetermined angle to the antenna face.

Figure 8:
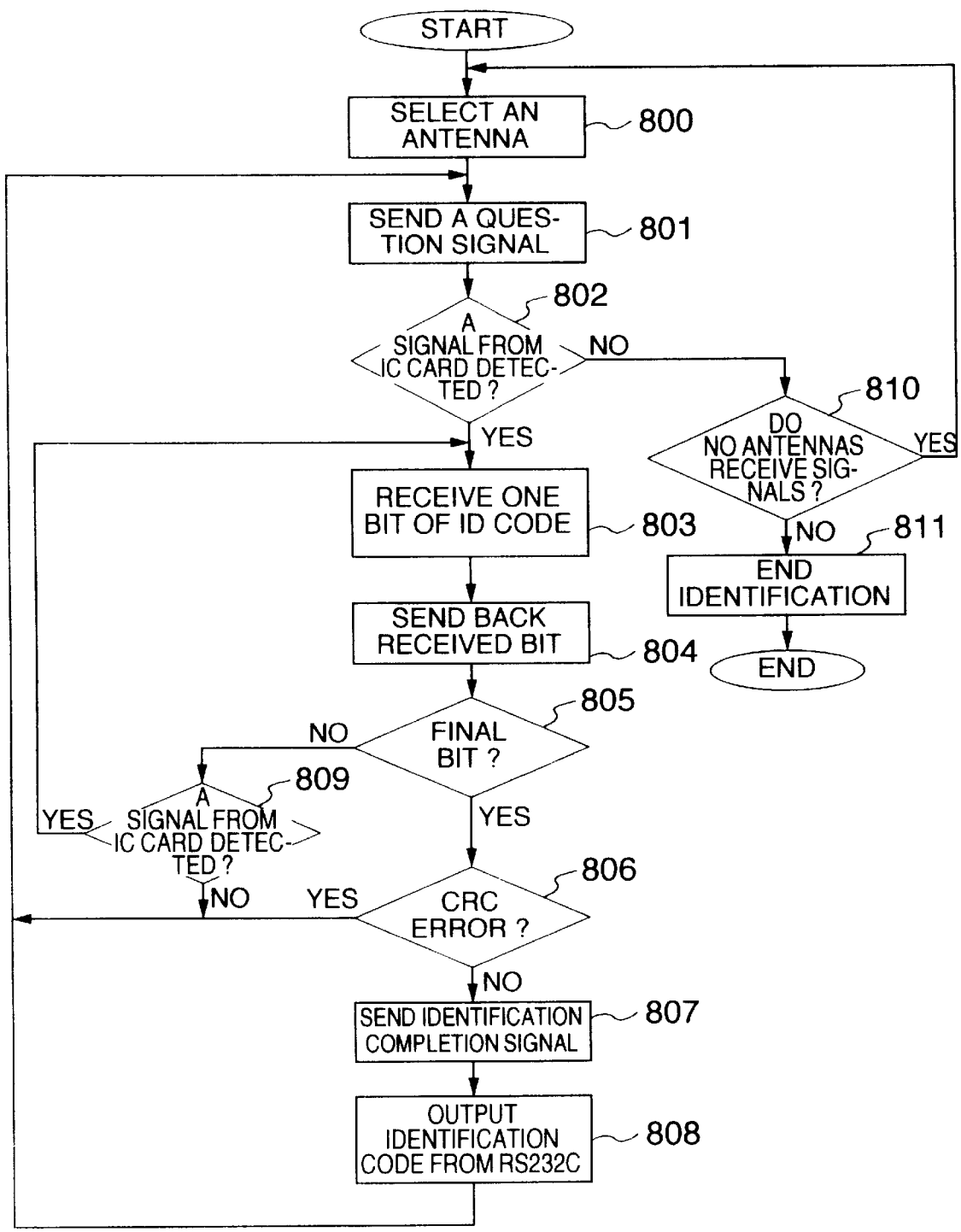
FIG. 8 is a flow chart of congestion control by a controller in an IC card identifying process.
Figure 9:
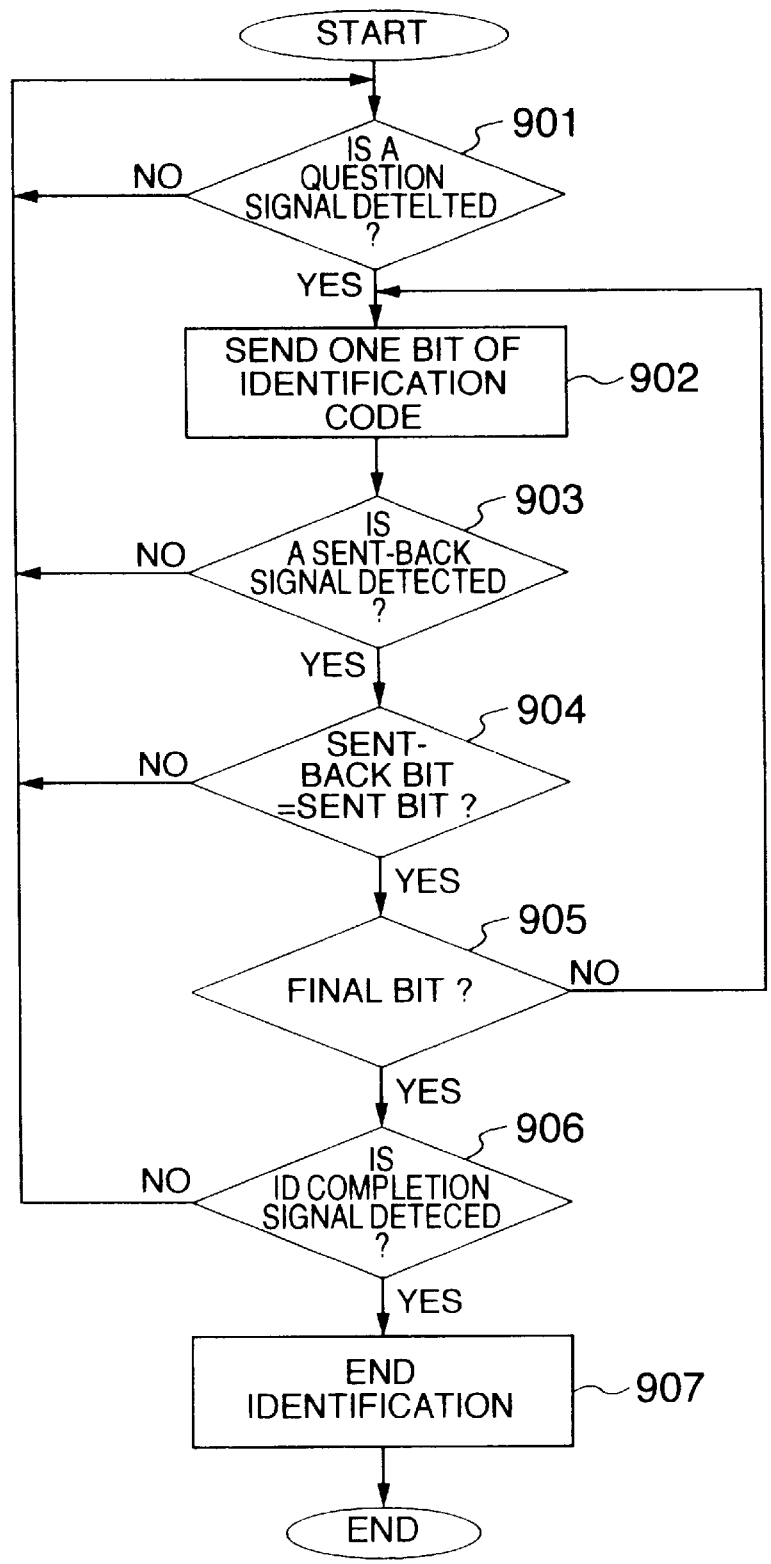
FIG. 9 is a flow chart of congestion control by an IC card in the IC card identifying process.

The congestion control by the inventive moving object identification device will be next explained with respect to FIGS. 8 and 9. FIG. 8 is a flow chart of the congestion control by the control circuit 206 of the controller 103. FIG. 9 is a flow chart of the congestion control by the control circuit 206 of an IC card 107.

The controller selects any one antenna (800). The selected antenna sends a question signal to IC cards in the coverage area of the controller antenna (801). Receiving the controller's question signal, the IC card sends the controller one bit of an identification code inherent to the IC card.

The controller detects the signals sent from IC cards (802). When the controller cannot detect the signals, the controller selects another antenna (800) and repeats the same operation. When the signals cannot be detected by any antenna, the controller regards the identification of all the IC cards as being completed and ends the identification (811).

When the controller detects a signal from an IC card, the controller receives one bit of the identification code (803) and sends the received bit back to the IC card (804). The IC card receives the sent-back bit and sends the next one bit of the identification code to the controller in accordance with the flow chart of chart 9. The controller checks whether the received bit is the final one of the identification code by counting the number of received bits (The identification code length is provided so as to have a constant value in the system) (805).

When the received bit is not the final one, the controller checks whether the next bit has been sent from the IC card (809). If this signal is detected, the controller receives the next one bit of the identification code sent from the IC card (803). On the other hand, when the controller cannot detect the next sent bit, the controller regards the identification as having failed and again sends the question signal to the IC card (801).

When the received bit of the identification code is the final one, the controller makes a CRC check on all the received bits (806). If there are any errors involved, the controller sends the IC card the question signal again (801). On the other hand, where there are no errors involved, the controller determines that the identification code has been correctly received, and returns an identification completion signal to the IC card to notify the IC card of that fact (807). The identification code of the identified IC card is outputted from the connecting cable to the control terminal (808). The controller repeats the above-mentioned processing, starting from sending the question signal again (801).

The control circuit of the IC card waits for a question signal coming from the controller (901). When the IC card detects the question signal from the controller, the IC card sends only one bit of the identification code thereof (902). The IC card checks whether there is any one bit of the identification code sent back by the controller (903). If that bit does not exist, the IC card returns to the state of waiting for the question signal (901).

When the IC card receives the sent-back one bit of the identification code, the IC cards compares that bit with the one bit of the identification code which the IC card has sent (904). When the received bit does not coincide with the sent bit, the IC card regards the IC card as having failed in the identification and returns to the state of waiting for arrival of a question signal (901). When the received bit coincides with the sent bit, the IC card checks whether the bit is the final one (905). When it is not the final bit, the IC card sends the following bit (902). If it is the final bit, the IC card waits for arrival of an identification completion signal from the controller (906). If no identification completion signal is detected, the IC card returns to the state of waiting for arrival of a question signal (901). When the identification completion signal is detected, the IC card assumes a success in the identification and ends the identifying operation (907).

Figure 10A:
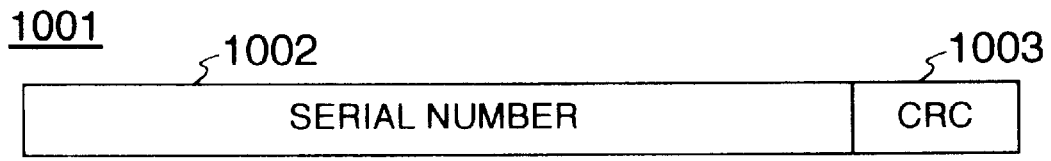
FIGS. 10A and 10B each show an identification code given to the IC card.
Figure 10B:
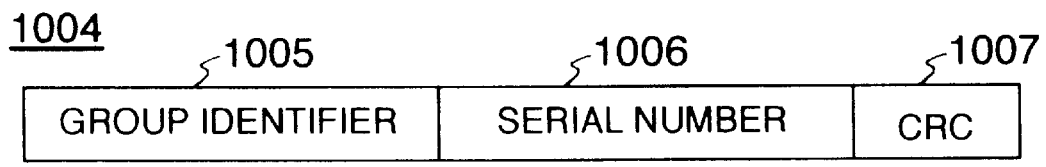

FIGS. 10A and B illustrate the composition of an identification code affixed to an IC card. The identification code should be unique to each IC card. An Identification code 1001 shown in Fig. 10A is composed of a serial number 1002 and a CRC code 1003. Fig. 10B illustrates another identification code 1004 composed of a group identifier 1005, a serial number 1006, and a CRC code 1007. The group identifier 1005 shows that the IC card belongs to a specified group. For instance, a group code different depending on the type of a physical distribution company or service may be affixed. At this time, the serial number 1006 is given as a unique one in specific group.

When an identification code with such a group identifier is used, an identifying process which identifies only an IC card which belongs to a specific group can be achieved. FIG. 11 shows a flow chart of congestion control by the control circuit 206 of the controller 103 in that identifying process. The same reference numeral is used to identify the same control step in the flow charts of FIGS. 11 and 8 with the processing at steps 812 and 813 being added newly in FIG. 11.

When the controller receives one bit of the identification code of the IC card (803), it checks whether the received bit composes a part of a group identifier (812). This checking is facilitated by confirming which position the received bit has in an arranging order of the identification code bits. Thus, if the received bit corresponds to the group identifier, the controller sends back a corresponding bit of the group identifier irrespective of the received bit.

If the received bit is not the one which composes a part of the group identifier, the controller sends back the received bit itself to the IC cards (804). Thereafter, the controller performs processing similar to that represented by the flow chart of FIG. 8.

The flow chat of the congestion control by the control circuit 203 of the IC card 107 at this time may be the same as that shown in FIG. 9.

One of the features of this invention is to send/receive a one-bit signal between the controller and the IC card. The operation of the inventive moving object identification device will be next described with reference to FIGS. 12–16 from a standpoint of communication between the controller and the IC card.

Figure 12A:
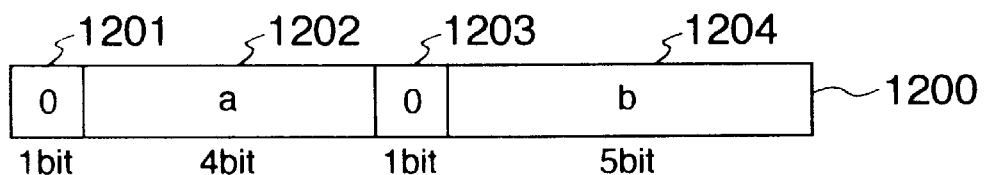
FIGS. 12A and 12B show the structures of frames used in the controller and the IC card for communicating purposes.
Figure 12B:
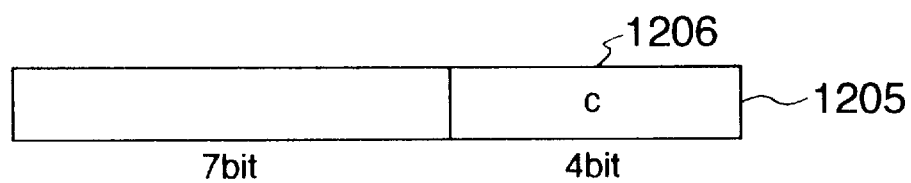

A frame structure used for communication between the controller and the IC card is shown in FIGS. 12A and B. A down frame 1200 of FIG. 12A is used for down communication from the controller to the IC card whereas an up frame 1205 of FIG. 12B is used for up communication from the IC card to the controller. The down frame 1200 is composed of four fields where the first field 1201 is an area of one bit which is always 0; the second field 1202 is an area of four bits which represent a command or data to be sent to the IC card; the third field 1203 is an area of one bit which is always 0; and the fourth field 1204 is an area of five sync bits taking a pattern of "01111" or "11111". The former "01111" represents that the send signal is a command while the latter "11111" represents that the send signal is data. The pattern of sync bits does not appear outside the third field 1204. The sync bits of the field 1204 are not necessarily required to take the pattern of "01111" or "11111", but may take any pattern which does not appear outside the field 1204.

In the up frame 1205, only the value of the field 1206 has significance. The field 1206 is an area of four bits which start from a seventh bit in the up frame. The whole area is encoded in a Manchester code so as to represent the value of one bit of the identification code. For example, "0011" is defined as "0" of the identification code, and "1100" as "1" of the identification code. Transmission of a down frame from the controller to the IC card and the transmission of an up frame from the IC card to the controller are synchronized by a clock signal generated by the rectifier circuit of the IC card.

FIG. 13 shows a listing 1300 of commands of the controller. A 4-bit string which represents a command code 1301 in a binary notation is sent by the first field 1201 of the down frame. For example, a command 7 is a question one. A signal representing this question command starts to identify the IC card. Similarly, a command 8 is a data read command, and a command 9 a data write command.

(1) Identification of an IC Card (Congestion Congtrol)

Figure 14:
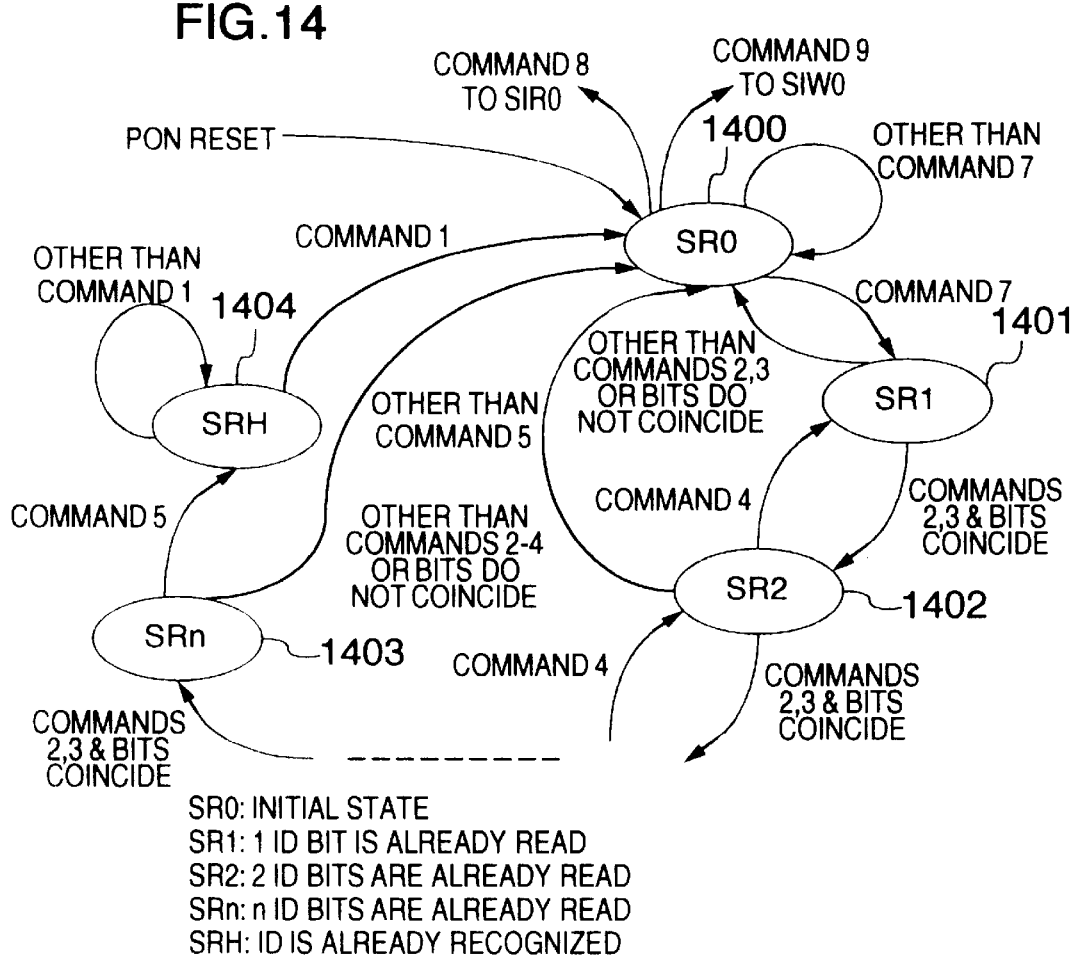
FIG. 14 is a state transition diagram in the IC card recognizing process.
Figure 15:
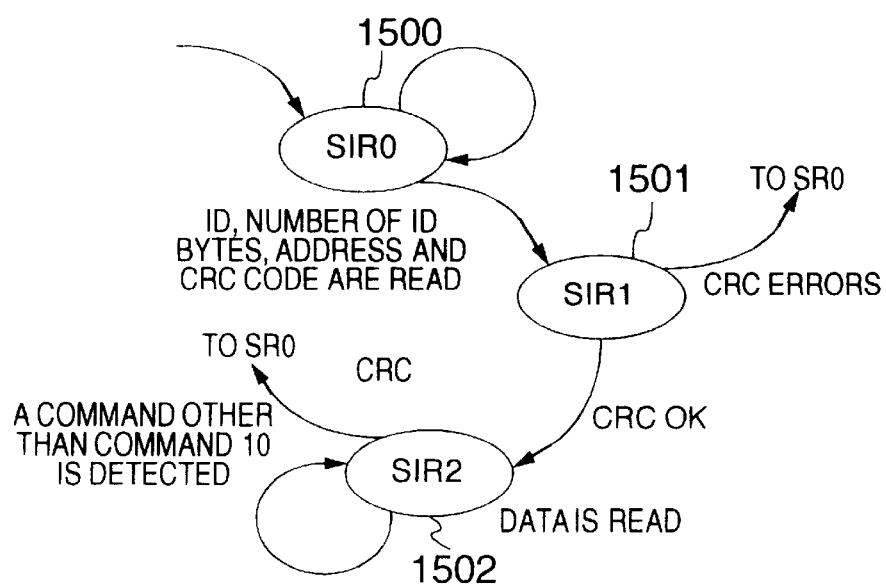
FIG. 15 is a state transition diagram in an IC card non-volatile memory reading process.
Figure 16:
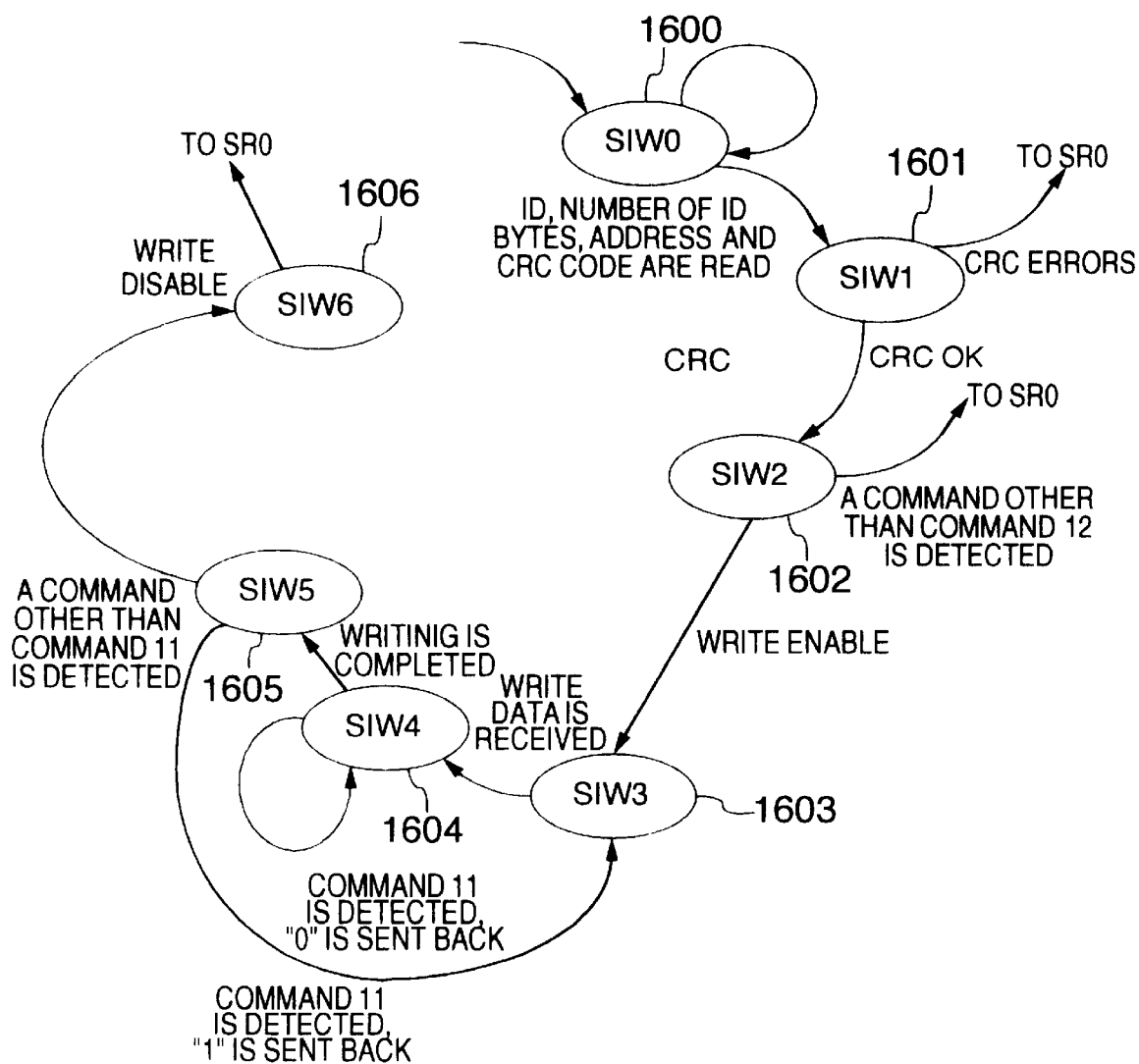
FIG. 16 is a state transition diagram in an IC card non-volatile memory writing process.

FIG. 14 is a state transition diagram in the IC card identification process. When the IC card enters a radiation area of the controller antenna, power is supplied to the IC card to thereby reset power-on in the control circuit of the IC card. Let this state be a state SR0 (1400). When the IC card receives a command 8 (ID/address specifying and reading) in this state, the state changes to a state SIRO (FIG. 15). When the IC card receives a command 9 (ID/address specifying and writing), the state changes to a state SIW0 (FIG. 16). When the IC card receives a command other than commands 7, 8 and 9 in state SR0, the state SR0 remains unchanged.

When the IC cards receives a command 7 (question) in the state SR0, the IC card sends the controller the value of the head bit of the identification code thereof. The state in this case is a state SRI (1401). To send the value of the one bit, the field 1206 of the up frame 1205 is used.

The state SRk (k=1−n) represents that k bits of the identification code have been read. The controller notifies the IC card of its received value, using a command 2 (0 is sent back) or a command 3 (1 is sent back). As shown in the flow chart of FIG. 9, if the value of one bit sent in the state SRk corresponds to a command from the controller, the state SRk changes to a state SRk+1. If not, the state SRk changes to the state SR0 (1400).

When sending all the bits ends (state SRn (1403)), the controller makes a CRC on those bits. If the controller detects no errors involved, it sends a command 5 (data is OK) to the IC card. When the controller detects errors involved, it sends a command 6 (data is NG). When the IC card receives the command 6, it regards the identification as having failed and its state changes to the state SR0 (1400). When the IC card receives the command 5, it regards the identification as completed and its state changes to a state SRH (1404), which remains until it receives a command 1 (initialize). Thus, thereafter, the IC card does not participate in the identifying process.

(2) Data Reading Process

FIG. 15 shows a state transition in a reading process for a non-volatile memory of the IC card. When the IC card receives a command 8 (ID/address specifying and reading) in the state SR0 (1400), the state of the IC card changes to a state SIR0 (1500). The controller sends the identification code of the IC card from which data are to be read, the number of bytes of the identification code, its read address, and a related CRC code to the IC card in units of four bits in the down frame 1200. The array of those data to be sent and the number of bits of those data are predetermined in the system. A state where all the data predetermined in the system have been received is a state SIR1 (1501).

In the state SIR1 (1501), a CRC is made on the received data. If there are any errors involved, the state changes to the state SR0 (1400). If not, the state changes to a state SIR2 (1502). The controller sends a command 10 (a one-bit data send-back command) to the IC card. Each time the IC card in the state SIR2 receives the command 10, it sends back data one bit at a time from a specified address. If the IC card receives a command other than the command 10, the state changes to the state SR0 (1400).

(3) Data Writing Process

FIG. 16 shows a state transition in a writing process for the non-volatile memory of the IC card. When the IC card receives a command 9 (ID/address specifying and writing) in the state SR0 (1400), the state changes to a state SIW0 (1600). The controller sends the IC card the identification code of the IC card into which data is to be written, the number of bytes and write address of the identification code, and a related CRC code. A state where all the data predetermined in the system have been received is a state SIW1 (1600).

In the state SIW1 (1601), a CRC is made on the received data. If there are any errors involved, the state changes to the state SR0 (1400). If not, the state changes to a state SIW2 (1602). The controller sends a command (write enable). When the IC card in the state SIW2 receives the command 12 (write enable), it places the non-volatile memory in a write enable state. This is a state SIW3 (1603), in which when the IC card receives two bytes of data to be written, it starts to write data into the non-volatile memory. The state in this case is a state SIW4 (1604), in which the IC card sends back "0" to the controller in order to indicate that the memory is being written each time the IC card receives a command 11 (write status send back command). When two-byte data has been written at a specified address in the state SIW4, the state changes to a state SIW5 (1605). When the IC card receives a command 11 (write status send back command) in the state SIW5, the IC card sends back "1" to the controller to indicate that the data writing has been completed. When the IC card sends back "1", its state again changes to the state SIW3 (1603) where the IC card waits for arrival of the next write data and then repeats a process similar to that mentioned above. When the IC card receives a command other than the command 11 (write status send back command) in the state SIW5, it regards all the data as having been written and its state changes to a state SIW6 (1606). In this state, the IC card places the non-volatile memory in a write disenable state and the state changes to a state SR0 (1400).

Figure 17:
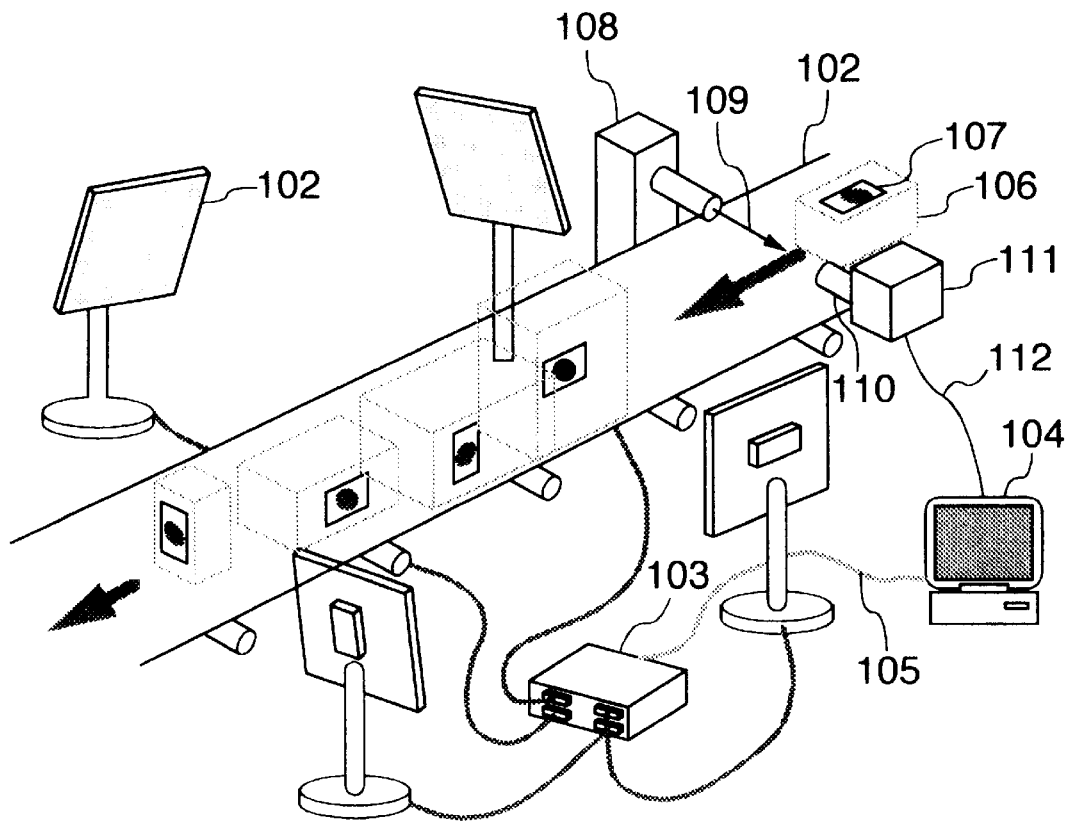
FIG. 17 shows another embodiment of the inventive moving object identification device applied to a physical distribution management system.

An arrangement to improve the reliability of the identification in the embodiment of the inventive moving object identification device applied to the physical distribution management system will be described next with respect to FIG. 17. The same reference numeral used in FIGS. 17 and 1 denotes the same component. An electromagnetic wave radiator 108 which radiates electromagnetic waves 109 such as infrared rays which do not pass through a pack and a sensor 110 which senses the electromagnetic waves 109 are provided at a point upstream of the belt conveyer 101 on which packs are conveyed one by one without being piled up upon one another. A pack sensor 111 recognizes that a pack 106 is passing because the sensor 110 is turned off. Information on passage of the pack recognized by the sensor 123 is delivered via the connecting cable 112 to the control terminal 104.

The control terminal 104 counts the number of packs recognized by the pack sensor 112. By collating the number of packs with the number of IC cards recognized by the moving object identification device provided downstream, it is possible to check any packs which are not identified by the moving object identification device. As shown in FIG. 1, when the moving object identification device performs the identifying process, it is obvious from the above description that there is no problem although packs are piled up on one another on the conveyer.

The reliability of the identifying process by the whole system is improved by causing a plurality of moving object identification devices to perform their respective identifying processes at corresponding positions along the belt conveyer and checking the results of the identification at the plurality of positions. In this case, the plurality of identification devices are preferably provided after positions where packs are reloaded or a plurality of belt conveyers merge because the reliability of the identifying process is improved by identifying packs different in loading state.

In order to reduce the probability that the individual packs will not be identified, it could be considered that a plurality of IC cards are affixed to different surfaces of a pack.

Figure 18:
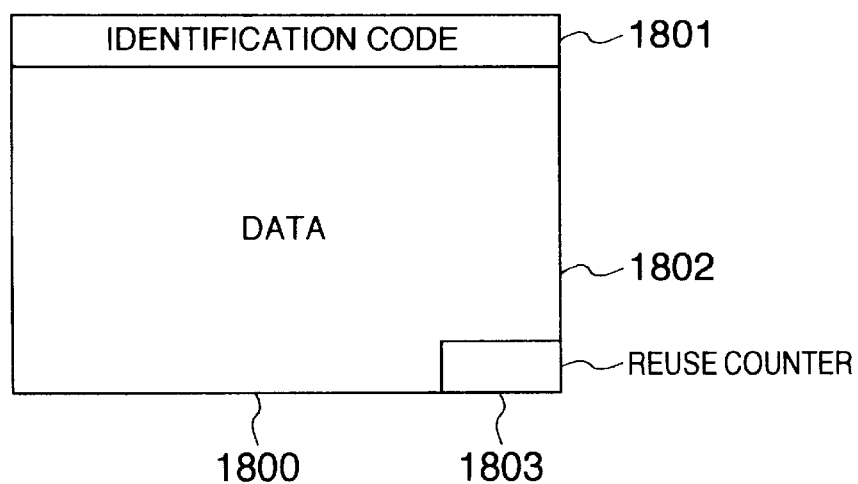
FIG. 18 shows a memory space of a non-volatile memory provided on the IC card.

FIG. 18 illustrates the composition of a memory space of a non-volatile memory provided on an IC card, which is reusable by updating the data stored in its memory. This composition is suitable for reuse of the IC card.

The memory space 1800 of the non-volatile memory includes an identification code 1801 and data 1802, and a reuse counter 1803. The identification code 1801 is the one shown in FIG. 10. The data 1802 is an area where any data is readable and writeable in accordance with an application used. In the physical distribution management system illustrated as the embodiment, the consignor's address, name, telephone number, and the consignee's address, name and telephone number, and the weight and contents of the pack are recorded. The reuse counter 1803 is used to control the life of the IC card because the number of times of writing data into a nonvolatile memory is limited and the IC card cannot be reused limitlessly. Thus, the reuse counter 1803 controls the number of times of reusing the IC card and discards the IC card if same is almost dead.

Figure 19:
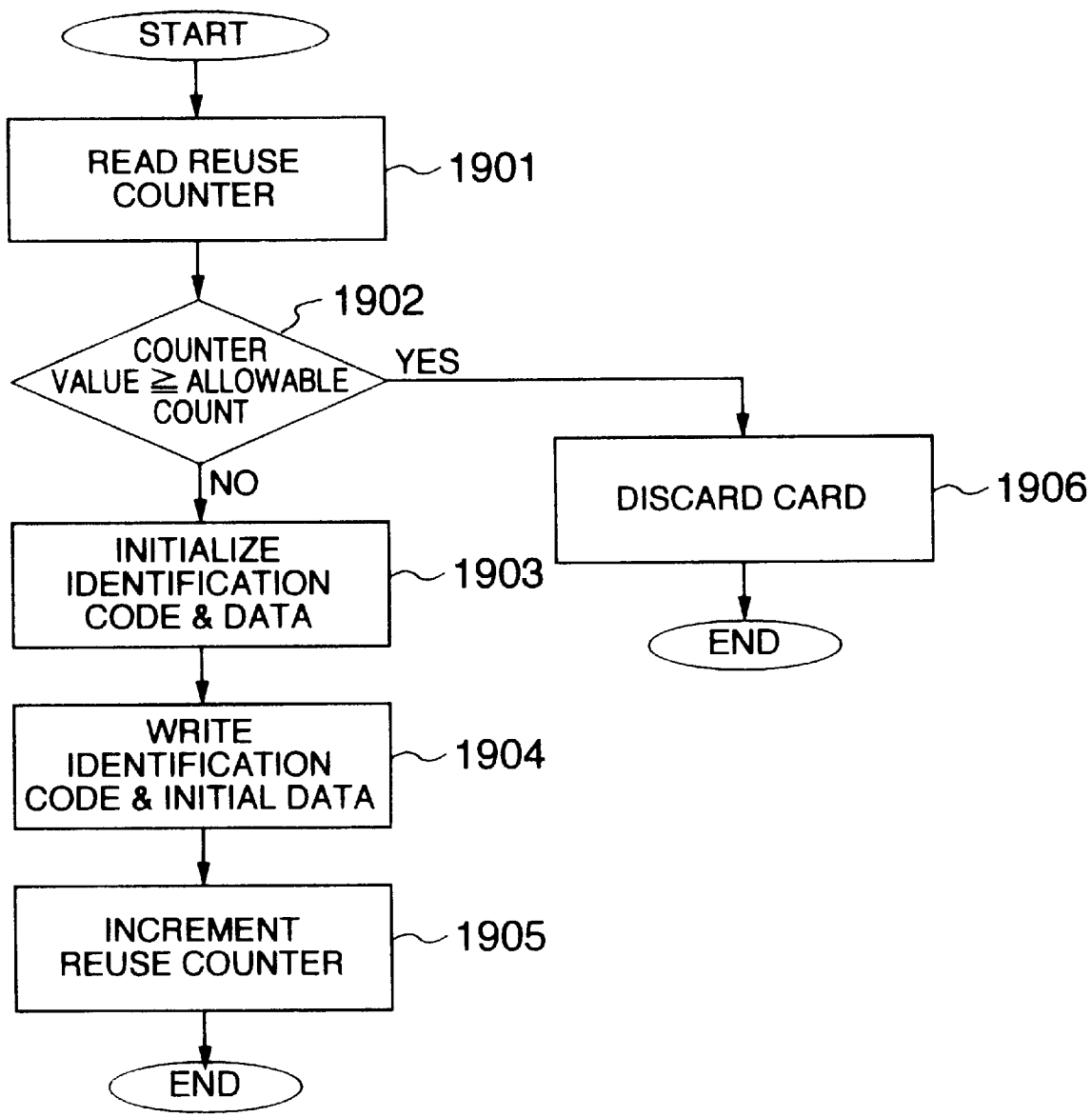
FIG. 19 is a flow chart of reuse of the IC card.

FIG. 19 is a flow chart of reusing an IC card, using the reuse counter 1803.

A system which issues an IC card reads a reuse counter for the IC card to be issued (1901), and checks whether the counter value exceeds an allowable count (1902). If so, the system determines that the card is almost dead and discards it (1906). If the value of the reuse counter is within the allowable count, it determines that the card is reusable and initializes the identification code 1801 and data 1802 in the memory space of the non-volatile memory (1903). Thereafter, the system writes into the IC card a new identification code and initial data (1904), and increments the reuse counter value (1905). If there is no need to change the identification code in the reuse, the processing at steps 1903 and 1904 is omitted.

This invention is changeable and applicable within the scope where the spirit thereof is not changed. For example, the IC card may include a power supply and an oscillator. In this case, a phased lock loop circuit is used to synchronize the controller with clocks.

In place of sending/receiving each bit, a combination of bits (for example, "00", "01", "10", "11") may be processed in a similar manner.

INDUSTRIAL APPLICABILITY

According to this invention, the controller sends back to an IC card each bit of an identification code of the IC card which the IC card sent to the controller. The IC card compares the sent-back bit and the bit which the IC card sent to the controller. If both are equal, the IC card further sends the next bit. If both are not equal, the IC card stops sending any more bits to thereby suppress to within a small value a reduction in the identifying efficiency even when the number of IC cards to be identified increases and simultaneously the number of IC cards which send their identification codes increases.

We claim:

1. A method of identifying a non-contact IC card in a non-contact IC card identification device which identifies an identification code of the non-contact IC card, comprising:

a first step of receiving a predetermined number of bits of the identification code sent by any one of a plurality of non-contact IC cards;

a second step of sending back the received predetermined number of bits of the identification code to the plurality of non-contact IC cards;

a third step of receiving a predetermined number of bits subsequent to the predetermined number of bits of the identification code sent by the non-contact IC card and coinciding with the sent-back bits; and a fourth step of repeating the second and third steps on the subsequent predetermined number of bits of the identification code if the subsequent predetermined number of bits of the identification code do not contain the final bit of the identification code, and sending to the IC card an identification completion signal indicating the completion of the identification if the subsequent predetermined number of bits of the identification code contain the final bit of the identification code.

2. The method according to claim 1, wherein the predetermined number is 1.

3. The method according to claim 1, wherein the identification code comprises an error correcting code; and said fourth step comprises sending the identification completion code if the subsequent predetermined number of bits comprise the final bit of the identification code and when the identification code is received correctly.

4. The method according to claim 1, wherein the non-contact IC card identification device comprises a plurality of selectable antennas; and said first step comprises trying to receive the predetermined number of bits, using any one of the plurality of selectable antennas, and if the predetermined number of bits are not received, trying to receive the predetermined number of bits, using another one of the plurality of selectable antennas.

5. A method of identifying a non-contact IC card in a non-contact IC card identification device which identifies an identification code of the non-contact IC card, wherein the identification code comprises a group identifier indicating that the non-contact IC card belongs to a predetermined group; and the method comprising:

a first step of receiving a predetermined number of bits of an identification code of any particuar one of a plurality of non-contact IC cards sent by the particular card;

a second step of sending back to the plurality of non-contact IC cards the bits of a group identifier to be identified and corresponding to the received predetermined bits of the identification code if the received predetermined number of bits are the ones which compose the group identifier and sending back the received predetermined bits to the plurality of non-contact IC cards if the received predetermined number of bits are not the ones which compose the group identifier;

a third step of receiving a predetermined number of bits subsequent to the predetermined number of bits of the identification code sent by the non-contact IC card and coinciding with the sent-back bits; and a fourth step of repeating the second and third steps on the subsequent predetermined number of bits of the identification code if the subsequent predetermined number of bits of the identification code do not contain the final bit of the identification code, and sending an identification completion signal indicating the completion of the identification if the subsequent predetermined number of bits of the identification code contain the final bit of the identification code.

6. The method according to claim 5, wherein the predetermined number is 1.

7. The method according to claim 5, wherein the identification code comprises an error correcting code; and said fourth step comprises sending the identification completion code if the subsequent predetermined number of bits comprise the final bit of the identification code and when the identification code is received correctly.

8. The method according to claim 5, wherein the non-contact IC card identification device comprises a plurality of selectable antennas; and said first step comprises trying to receive the predetermined number of bits, using any one of the plurality of selectable antennas, and if the predetermined number of bits are not received, trying to receive the predetermined number of bits, using another one of the plurality of selectable antennas.

9. A method of communicating between a non-contact IC card and a non-contact IC card identification device which sends an identification code of the non-contact IC card in units of a predetermined number of bits, wherein said non-contact IC card and said non-contact IC identification device communicate, using an up and a down frame synchronized with each other, respectively; and said down frame comprises a first area representing a predetermined bit send command for the IC card and a second area representing a sync bit, said up frame comprises a third area to send the predetermined bit in response to the predetermined bit send command in the synchronized down frame, and the sending period of the third area is included in a sending period of said second area for the non-contact IC card identification device.

10. The method according to claim 9, wherein the predetermined bit comprises one bit, and said third area represents one bit of the identification code in the form of a Manchester code.

* * * * *